Sept. 27, 1966     J. N. AKERS     3,275,530
MULTI-STAGE WATER DISTILLING APPARATUS
Filed Oct. 31, 1963     3 Sheets-Sheet 2
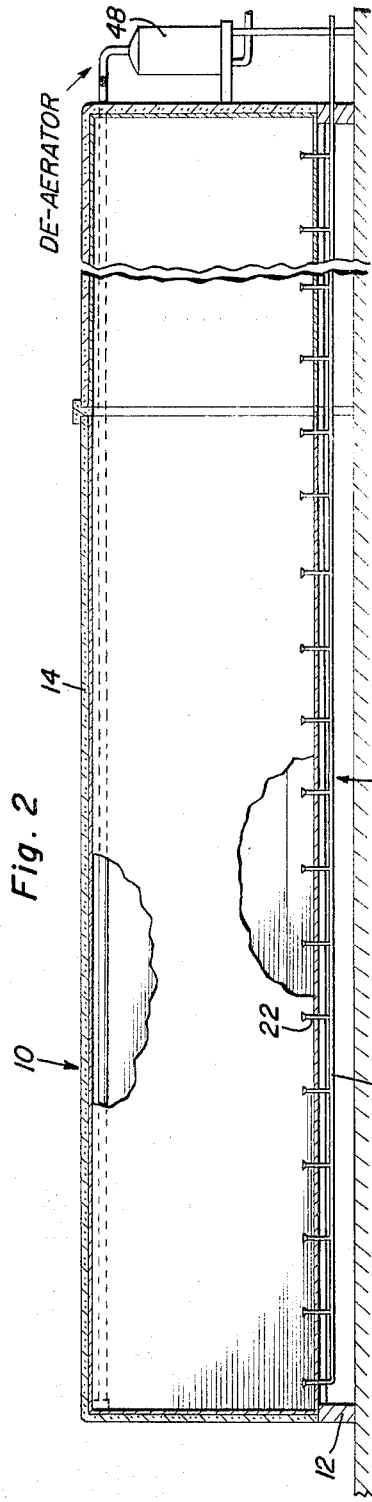
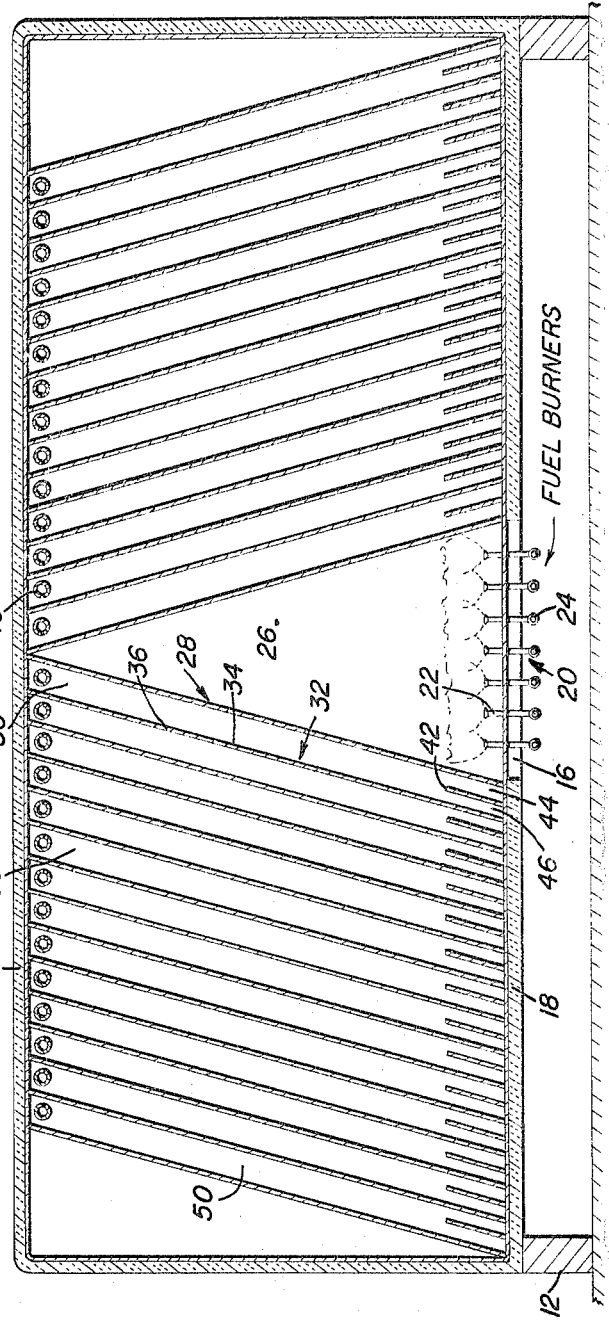
John N. Akers
INVENTOR.

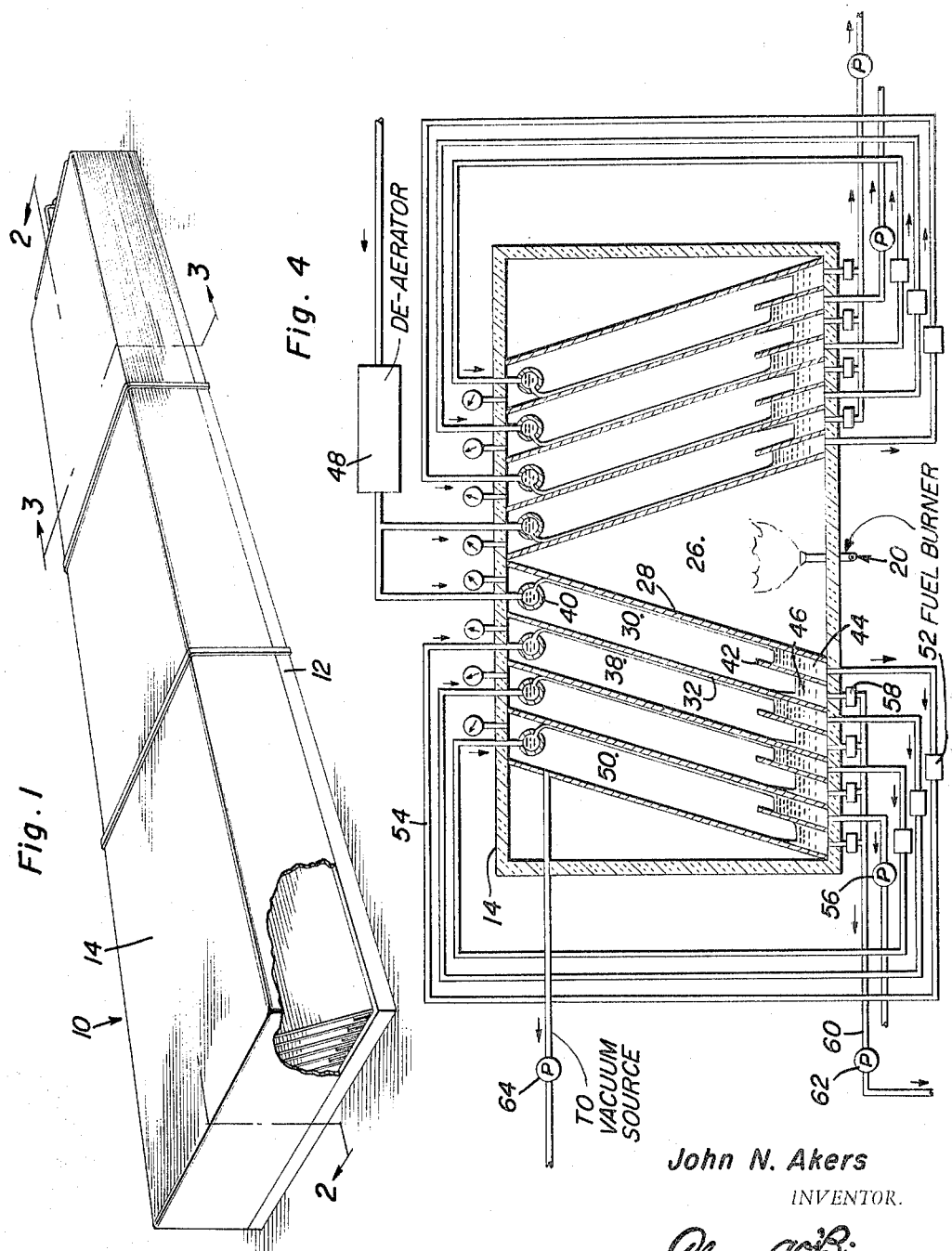

Sept. 27, 1966 J. N. AKERS 3,275,530
MULTI-STAGE WATER DISTILLING APPARATUS
Filed Oct. 31, 1963 3 Sheets-Sheet 3
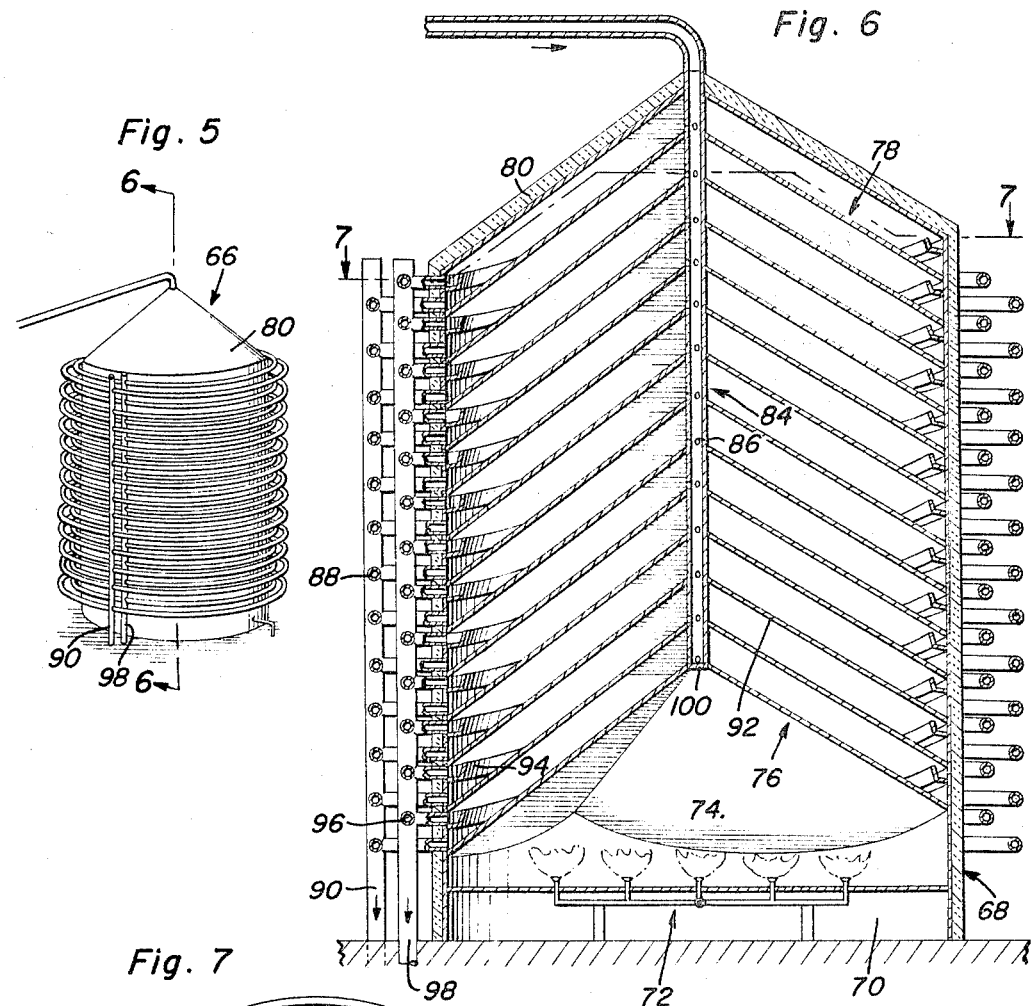
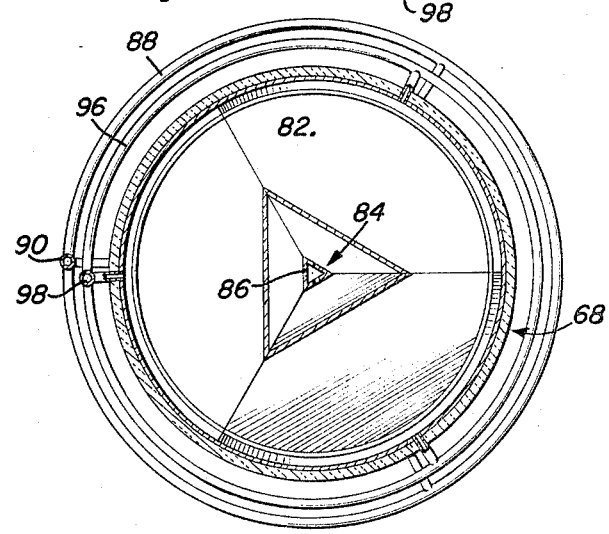
John N. Akers
INVENTOR.

3,275,530
MULTI-STAGE WATER DISTILLING APPARATUS
John N. Akers, Box 148, Columbia Theological Seminary, Decatur, Ga.
Filed Oct. 31, 1963, Ser. No. 320,407
2 Claims. (Cl. 202—174)

An important object of the present invention is to provide an economical method for purifying saline water which utilizes an evaporating and condensing arrangement similar to that disclosed in my prior co-pending application Serial No. 266,350 filed March 19, 1963, with respect to which the instant application is a continuation-in-part.

The present invention relates to a method and apparatus for extracting distilland from saline water for drinking purposes and other uses.

The method and apparatus of the present invention however, further involves multi-stage operation whereby distilland may be extracted from the incoming saline water in larger volumes and with more efficient utilization of the available energy for such purpose.

An additional object of the present invention is to provide a novel method and apparatus for extracting distilled water from saline water through partial vacuum operation so as to sustain multi-stage evaporation of the saline water and collection of distilland. Greater operational efficiency is thereby achieved in connection with the extraction of the distilland and at the same time, scale formation is reduced so as to involve a significant advantage in connection with the construction and maintenance of the apparatus.

The novel method of the present invention also permits the use of a wide variety of apparatus arrangements capable of being tailored to the particular needs and requirements of a given installation. Also in connection with the apparatus necessary for carrying out the method of the present invention, promise for a significant reduction in cost of equipment is held forth because of the suitability of cheaper materials, and lower operational costs.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 1 is a perspective view with parts broken away of a multi-unit arrangement for the apparatus of the present invention.

FIGURE 2 is a partial longitudinal sectional view taken substantially through a plane indicated by section line 2—2 in FIGURE 1.

FIGURE 3 is a transverse sectional view taken substantially through a plane indicated by section line 3—3 in FIGURE 1.

FIGURE 4 is a diagrammatic illustration showing one form of operational arrangement in connection with one of the units illustrated in FIGURES 1 through 3.

FIGURE 5 is a perspective view of another form of distilling unit made in accordance with the principles of the present invention.

FIGURE 6 is a longitudinal sectional view of the apparatus taken substantially through a plane indicated by section line 6—6 in FIGURE 5.

FIGURE 7 is a transverse sectional view taken substantially through a plane indicated by section line 7—7 in FIGURE 6.

Referring now to the drawings in detail, it will be observed from FIGURES 1 through 3, that several distilling units respectively referred to by reference numeral 10 may be mounted in a suitable arrangement adjacent to each other and operationally interconnected, the number of units depending upon the respective capacities of the individual units and the requirements for distilling water. The units may therefore be mounted on a suitable base 12 and enclosed by a heat insulating housing 14. Mounted within the base 12 and extending into the housing 14 through a longitudinal opening 16 in the bottom 18 thereof is heat generating equipment generally referred to by reference numeral 20. By way of example only, the heat generating equipment 20 may be in the form of a plurality of longitudinally spaced parallel rows of burners 22 respectively connected to longitudinal fuel supply tubes 24 which may extend through all of the units 10 for connection to a suitable supply of fuel under pressure. Accordingly, the burners will be operative to heat the central heating chamber 26 which extends longitudinally through each of the units 10.

The heating chamber 26 is enclosed between downwardly diverging panels 28 which are made of heat conductive material so that heat exchange will occur between the heated space of chamber 26 and the pressure sealed chambers 30 on opposite sides thereof. The pressure chambers 30 on opposite sides of the heating chamber 26 are therefore formed between the heating panels 28 and relatively closely spaced parallel panels 32. One side 34 of panel 32 facing the heating panel 28, forms a flat downwardly sloping condensing surface while the other side 36 of the panels 32 form evaporative heating surfaces. The panels 32 are therefore also made of heat conductive material. A plurality of closely spaced parallel panels 32 are therefore disposed on oposite sides of the heating chamber 26 as viewed in FIGURE 3 so as to form a plurality of additional pressure sealed chambers 38, the number of such chambers depending upon the operating conditions and requirements.

Longitudinally extending through each of the chambers 30 and 38 adjacent the upper ends thereof, are tubular conduits 40 through which saline water is conducted and discharged into each of the chambers 30 and 38. Accordingly, each of the conduits 40 is provided with longitudinally spaced openings constituting orifice nozzles arranged to discharge the saline water onto the downwardly sloping heating panels 28 and the heating surfaces 36 of the panels 32. It will therefore be apparent, that the saline water will flow downwardly as a moving film shown in FIG. 4 coating the sloping panels on the heating surfaces resulting in partial evaporation of the saline water. The slope of the panels is therefore selected in accordance with the desired rate of flow of saline water along the heating surfaces. Inasmuch as the condensing surfaces of the panels are closely spaced from the heating surfaces, the vapor formed by partial evaporation of the saline water will condense along the condensing surfaces 34. Each of the chambers 30 and 38 are therefore provided at the bottom ends thereof with partition elements 42 forming a collection trough 44 for the saline effluent and a collection trough 46 for the condensate.

The chambers 30 and 38 are pressure sealed so that the pressure therein may be controlled in order to control the boiling point temperatures of the saline water flowing therethrough by regulating the rate of withdrawal of effluent and condensate from the troughs 44 and 46 as will be hereafter explained. The apparatus may then be useful in connection with several different methods and arrangements for extracting distillate in a most efficient manner. For example, the incoming saline water may be simultaneously introdued into all of the conduits 40 and the effluent drained from the collection troughs 44 after one pass is made through one of the pressure sealed chambers, this arrangement being suitable where large volumes of saline water are available. The condensate from the troughs 46 may be continuously withdrawn for supply of distillate. Inasmuch as the chambers 30 and 38 into which the saline water is introduced, are pressure sealed, facilities must be provided for removal of gases entrained therewithin. One method for achieving this is to provide a deaerating unit 48 through which the saline water flows before being led to the inlet ends of the conduits 40 as more clearly seen in FIGURE 2. The saline water may be introduced through all of the conduits 40 in one unit 10 and then successively through the other units so that a more concentrated effluent will be drained from the final unit. Alternatively, the saline water may pass through each of the chambers in each unit beginning with the chambers 30 and the effluent finally drained from the collection troughs of the final chambers 50 in each of the units. With respect to the pressures maintained in each of the chambers, several different arrangements may be resorted to. For example, the chambers may all be maintained at the same partial vacuum pressure, below atmospheric pressure in order to reduce the boiling point temperature of the saline water and thereby enhance evaporation as well as to reduce scale formation because of the lower operating temperatures involved. The pressures within the chambers may also be progressively reduced by increasing amounts beginning with the chambers 30 and ending with the final chambers 50. In this manner, saline water when introduced successively into the chambers may be flashed in order to sustain partial evaporation in each of the chambers. In all cases however, the heating surface in each chamber causes partial evaporation of the saline water flowing therealong so that vapor will condense on the closely spaced condensing surface, the heat exchanged during said condensation being transferred through the heating surface of the next adjacent chamber so as to produce partial evaporation therein. Thus, a multi-stage evaporating and condensing process occurs with the initial chambers 30 on opposite sides of the central heating chamber 26 being initially supplied with heat energy by elevating the temperature of the heating panels 28 to sustain the multi-stage process.

Referring now to FIGURE 4, one form of operational arrangement is diagrammatically illustrated whereby the process may be carried on. It will therefore be observed, that saline water is conducted through the deaerator unit 48 and led into the conduits 40 associated with the chambers 30 on opposite sides of the heating chamber 26. The saline water will then flow downwardly along the heating panels 28 maintained at the proper elevated temperature by the heat generating means 20. Partial evaporation will occur within the chambers 30 resulting in the collection of condensate in the trough 46 while a saline effluent is collected in the trough 44 of the chamber 30 at an elevated temperature as compared to the temperature of the saline water when introduced into the chamber from the conduit 40. The saline effluent is then conducted from the trough 44 through a flow constricting control valve 52 and introduced by the conduit 54 into the supply conduit 40 associated with the next chamber 38. The saline effluent collected by the trough 44 in the chamber 38 is then again conducted through another flow constricting valve for introduction into the next chamber, and so on. Thus, the saline water becomes progressively more concentrated as it is successively introduced into each sealed chamber and is finally withdrawn from the collection trough 44 of the final chamber 50 by the suction pump 56. The flow control valves 52 connected to the respective collection troughs 44 of the chambers are therefore adjusted in accordance with the rate at which effluent is withdrawn by the suction pump 56, so as to maintain a constant volume of saline water within the collection troughs in each chamber in order to preserve the pressure therein. Similarly, the condensate collected in each of the troughs 46 is withdrawn through adjustable flow control valves 58 connected in parallel to the supply conduit 60 so that the condensate within the collection troughs 46 are maintained at a constant level in each of the chambers as condensate is withdrawn by the pump 62 connected to the conduit 60. A vacuum pump 64 may also be connected to the chambers so as to maintain the partial vacuum pressures therein as aforementioned.

The constructional principles of the apparatus as described with respect to FIGURES 1 through 4 may be utilized in connection with equipment of varying sizes and water handling capacities. Where, however, space is at a premium, a modified form of apparatus may be utilized as illustrated in FIGURES 5 through 7. In this form of apparatus, the distilling unit generally referred to by reference numeral 66 involves a heat insulative housing 68 in the form of a vertical cylinder or drum having an enclosed base portion 70 within which the heat generating means 72 is mounted. A heating chamber 74 is therefore formed above the heat generating burners 72, said heating chamber being enclosed by a lowermost panel assembly generally referred to by reference numeral 76.

Similar panel assemblies 78 are mounted within the housing 68 in close spaced relationship to each other and extending vertically upward from the panel assembly 76 toward the top insulating closure portion 80 of the housing. Each of the panel assemblies is formed by three flat panel sections 82 as more clearly seen in FIGURE 7. The panel sections are connected to and extend from a central tubular conduit 84 which extends vertically downwardly and is provided with vertically spaced openings 86 discharging saline water onto each of the panel sections 82 of each of the panel assemblies 76 and 78. Accordingly, the upper surfaces of the panel assemblies are heating surfaces, causing partial evaporation of the saline water flowing downwardly therealong for collection within the conduit 88 associated with each of the panel assemblies, so that the saline effluent may be withdrawn by the vertical conduit 90. Also mounted within each of the chambers 92 formed between the panel assemblies, and below the under surfaces thereof, are condensate collection troughs 94. The condensate collected by the troughs 94 are therefore led into the annular conduit 96 associated with each of the panel assemblies so that the distillate may be withdrawn by the vertical conduit 98. The panel assemblies are made of flat sections so that the condensate may drain from the underside condensing surfaces into the troughs 94 without leaving contact and under the directional influence of gravity because of the flatness of the surfaces as distinguished from curved surfaces. The chambers 92 will also be pressure sealed for pressure controlling purposes as described with respect to FIGURES 1 through 4. Because of the illustrated arrangement in FIGURES 5 through 7, the saline water will be simultaneously introduced into each of the chambers through the vertical conduit 84, the lower end 100 of which is closed.

From the foregoing description, the construction of the apparatus and the method involved will be apparent. It will therefore be appreciated, that continuous and efficient operation may be effected for distilling water utilizing equipment capable of being manufactured at a reduced cost and operating in such a manner as to be capable of handling large volumes of water continuously with less maintenance problems.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for the distillation and recovery of potable distillate from saline water with comprises, a plurality of pressure sealed chambers disposed adjacent one another and in heat exchange relationship with each other, each of said chambers comprising an inverted V-shaped central heating chamber having a group of closely spaced parallel plates which are vertically inclined and arranged on opposite sides of a vertical axis extending centrally through said heating chamber, the groups of plates being oppositely inclined and wherein each plate is extended to the top and bottom walls of the chamber forming a plurailty of evaporator-condenser compartments, a fuel burner disposed in the bottom of said central heating chamber, said heating chamber comprising a pair of oppositely inclined inner plates which form the side walls of said central chamber and which plates are directly heated by said burner, said plates of each compartment providing a heated evaporative plate surface facing towards said burner with a co-acting side surface on the next adjacent plate forming a condensing surface for condensate within each compartment, a de-aerator connected to an inlet conduit for conducting saline water into said evaporator-condenser compartments, said de-aerator being connected to a branched-pair of conduits for introducing saline water concurrently into the top of the compartments which include said oppositely inclined inner plates, nozzle means disposed on the discharge ends of each of said pair of conduits for effecting film-flow of saline water downwardly over the sloping surface of said inner plates while the same are heated by said burner, each of said compartments comprising a partition extending from the bottom of the compartment for a short length and dividing said compartment into two sub-compartments, one of said sub-compartments forming a collection trough for said saline water and the other a trough for collecting said condensate, means comprising a saline-conveying conduit connected to each of said saline collection troughs for introducing saline water progressively from one compartment into the top of the next succeeding evaporator-condenser compartment of the respective groups for supplying saline water thereto and film-flowing the same downwardly over the plates in succession, adjustable flow control valves connected to each of said saline-conveying conduits, pump means connected to the end compartment of each of said groups for conveying away unevaporated saline water, means comprising a condensate-withdrawing conduit for withdrawing condensate from each of said condensate collecting troughs, adjustable flow control valves connected to each of said condensate-withdrawing conduits, said adjustable flow valves in said saline-conveying conduits and said condensate-withdrawing conduits being connected in parallel and respectively adjusted so that a constant level of condensate and saline water respectively is maintained in said evaporator-condenser compartments, and vacuum pump means connected to the end compartment of one of said groups for maintaining subsatmospheric pressures in said compartments.

2. Apparatus for the distillation and recovery of potable distillate from saline water which comprises, a plurality of pressure sealed chambers disposed adjacent one another and in heat exchange relationship with each other, a heating chamber having a group of closely spaced parallel plates which are vertically inclined and arranged on opposite sides of a vertical axis extending through said heating chamber, the groups of plates being oppositely inclined and forming a plurality of evaporator-condenser compartments constituting said pressure sealed chambers, heat generating means disposed in said heating chamber, said heating chamber comprising a pair of oppositely inclined inner plates which form the side walls thereof and which plates are directly heated by said heat generating means, said plates of each compartment providing a heated evaporative plate surface facing towards said heating chamber with a coacting side surface on the next adjacent plate forming a condensing surface for condensate within each compartment, inlet conduit means for introducing saline water concurrently into the top of the compartments which include said oppositely inclined inner plates, nozzle means disposed on the inlet conduit means for effecting film-flow of saline water downwardly over the sloping surface of said inner plates while the same are heated by said heat generating means, each of said compartments including a partition extending from a lower end thereof for a short length and dividing said compartment into two sub-compartments, one of said sub-compartments forming a collection trough for said saline water and the other a trough for collecting said condensate, means comprising a saline-conveying conduit connected to each of said saline collection troughs for introducing saline water progressively from one compartment into the top of the next succeeding evaporator-condenser compartment of the respective groups for supplying saline water thereto and film-flowing the same downwardly over the plates in succession, adjustable flow control means connected to each of said saline-conveying conduits, pump means connected to the end compartment of each of said groups for conveying away unevaporated saline water, means comprising a condensate-withdrawing conduit for withdrawing condensate from each of said condensate collecting troughs, adjustable flow control means connected to each of said condensate-withdrawing conduits, said adjustable flow control means in said saline-conveying conduits and said condensate-withdrawing conduits being connected in parallel and respectively adjusted so that a constant level of condensate and saline water respectively is maintained in said evaporator-condenser compartments, and a source of vacuum pressure connected to the end compartment of one of said groups for maintaining subatmospheric pressures in said compartments.

References Cited by the Examiner
UNITED STATES PATENTS

| | | | |
|---|---|---|---|
| 945,640 | 1/1910 | Thelen et al. | 202—174 X |
| 1,930,861 | 10/1933 | Reich | 202—174 |
| 2,636,129 | 4/1953 | Agnew. | |
| 2,908,618 | 10/1959 | Bethon | 202—45 X |
| 3,004,590 | 10/1961 | Rosenblad | 202—174 X |

NORMAN YUDKOFF, *Primary Examiner.*

F. E. DRUMMOND, *Assistant Examiner.*